(No Model.)　　　　　　　　　　　　　　　　　　5 Sheets—Sheet 1.
L. KIEFER.
MACHINE FOR CUTTING WABBLERS IN ENDS OF ROLLS.

No. 550,756.　　　　　　　　　　　　Patented Dec. 3, 1895.

Witnesses　　　　　　　　　　　　　　　　Inventor

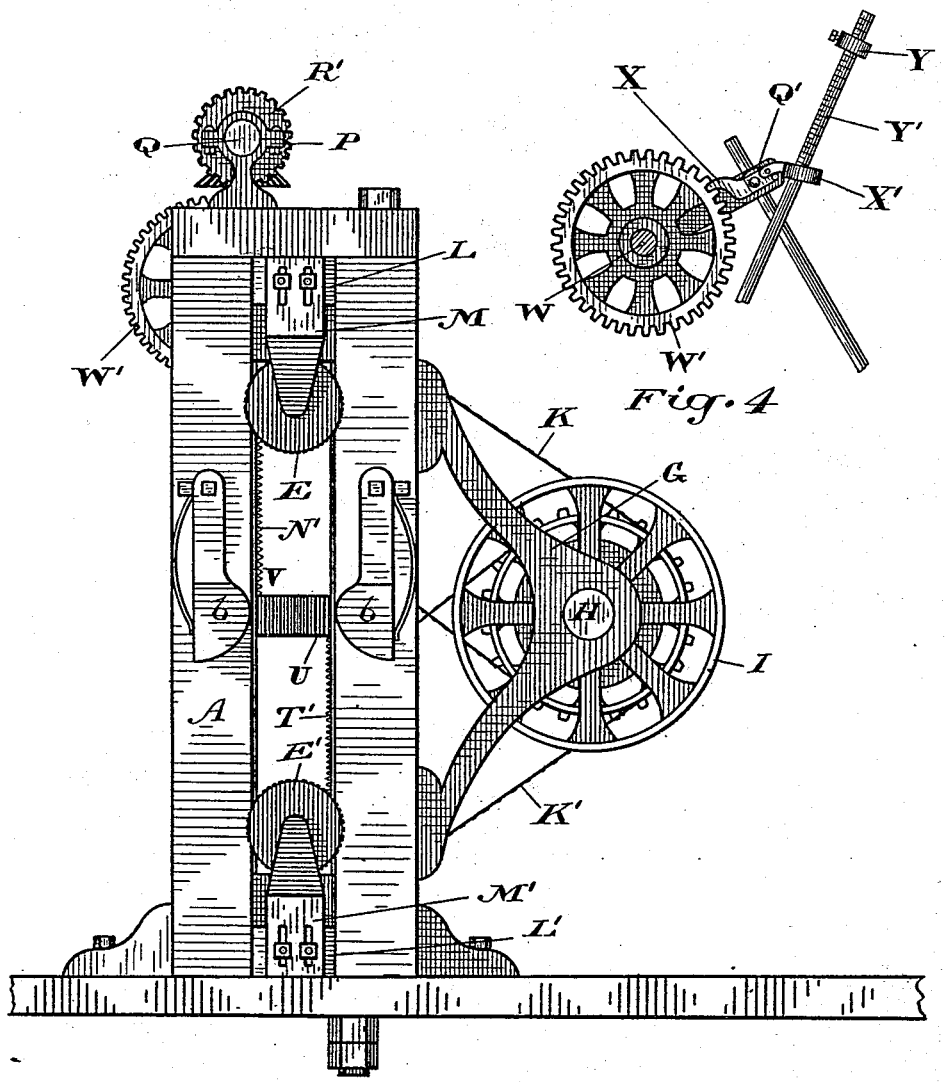

(No Model.)   5 Sheets—Sheet 4.

L. KIEFER.
MACHINE FOR CUTTING WABBLERS IN ENDS OF ROLLS.

No. 550,756.   Patented Dec. 3, 1895.

Witnesses   Inventor (No Model.)

L. KIEFER.
MACHINE FOR CUTTING WABBLERS IN ENDS OF ROLLS.

No. 550,756. Patented Dec. 3, 1895.

5 Sheets—Sheet 5.

Witnesses

Inventor

UNITED STATES PATENT OFFICE.

LOUIS KIEFER, OF SHARON, PENNSYLVANIA, ASSIGNOR OF ONE-HALF TO FRANK A. MALCOLM, OF SAME PLACE.

MACHINE FOR CUTTING WABBLERS IN ENDS OF ROLLS.

SPECIFICATION forming part of Letters Patent No. 550,756, dated December 3, 1895.

Application filed March 7, 1895. Serial No. 540,847. (No model.)

*To all whom it may concern:*

Be it known that I, LOUIS KIEFER, of Sharon, in the county of Mercer and State of Pennsylvania, have invented a Machine for Cutting Wabblers in the Ends of Rolls for Rolling Metal; and I hereby declare that the following is a full, clear, and exact description of the same.

This invention relates to a machine for cutting wabblers in the ends of rolls for rolling metal; and the object of the invention is to construct a machine by means of which one or more wabblers may be automatically cut to any required predetermined depth in the end of the roll at a single and continuous operation of the machine and to so arrange the several parts of the machine that when the wabbler has been cut to the predetermined and required depth the cutting action of the cutting-tool can be stopped.

The machine consists, essentially, of two rotary cutter-heads arranged to be moved toward or away from their work as required, in order that they can cut the wabblers in the rolls to any required and predetermined depth, mechanism for imparting to the cutter-heads a rotary motion, and mechanism for moving the cutter-heads to or away from their work.

The invention consists, essentially, of the device hereinafter more fully set forth and more particularly pointed out in the claims.

Figure 1:
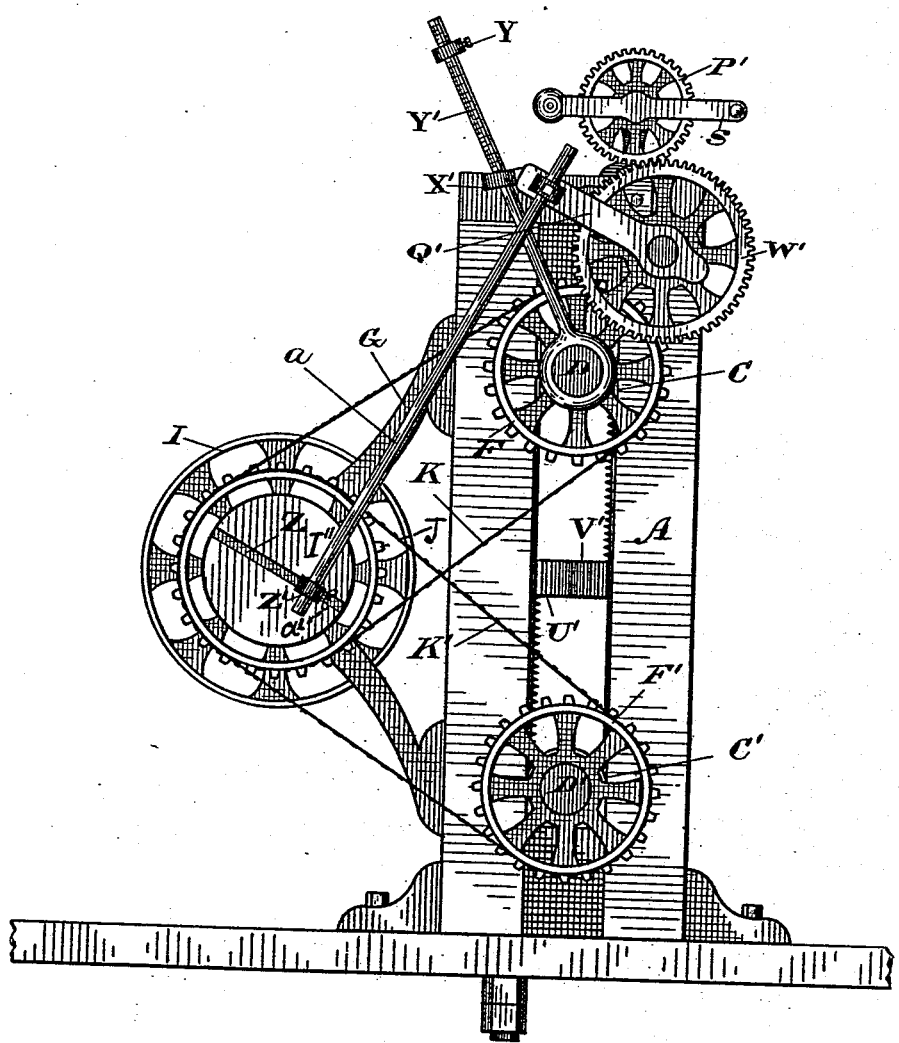
Figure 2:
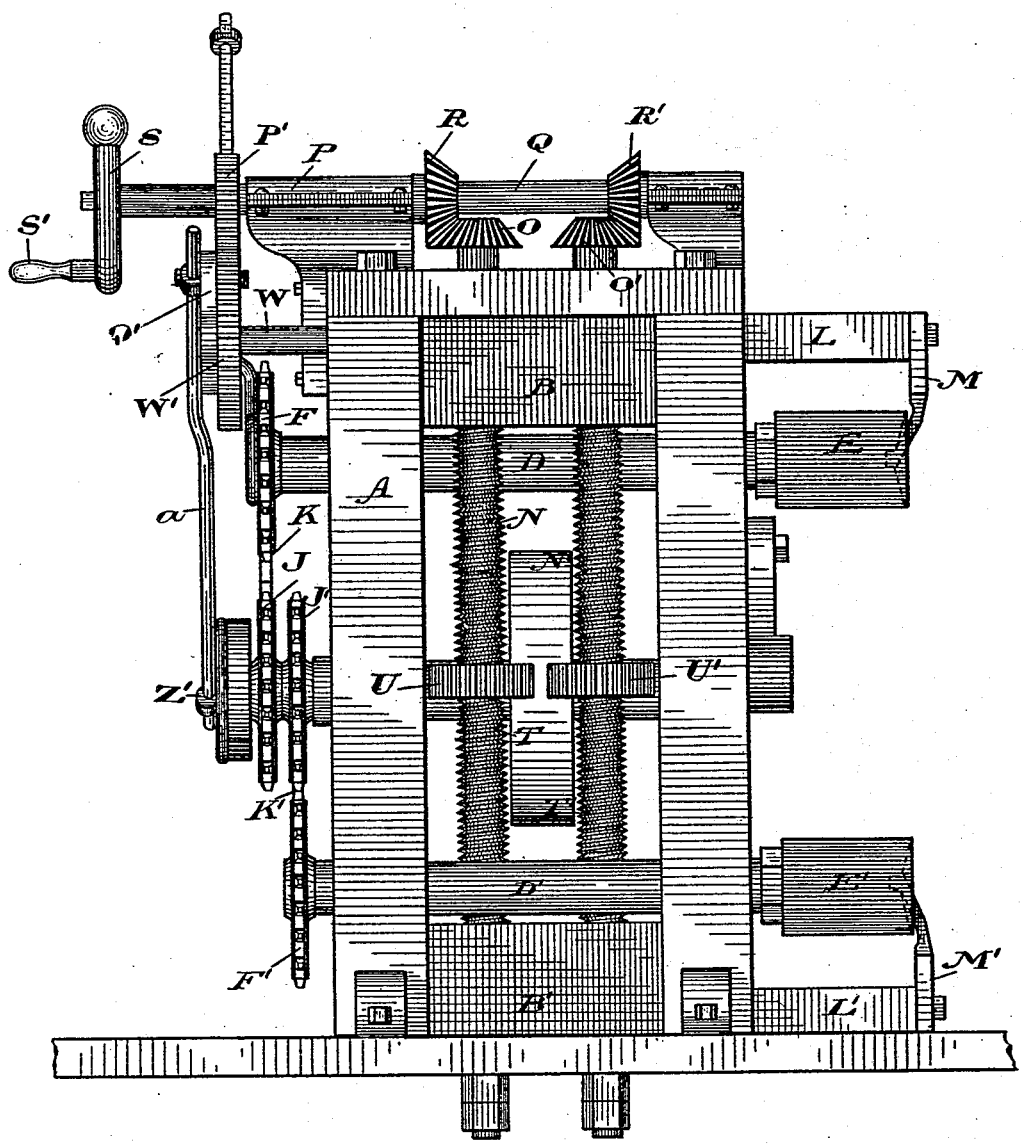
Figure 5:
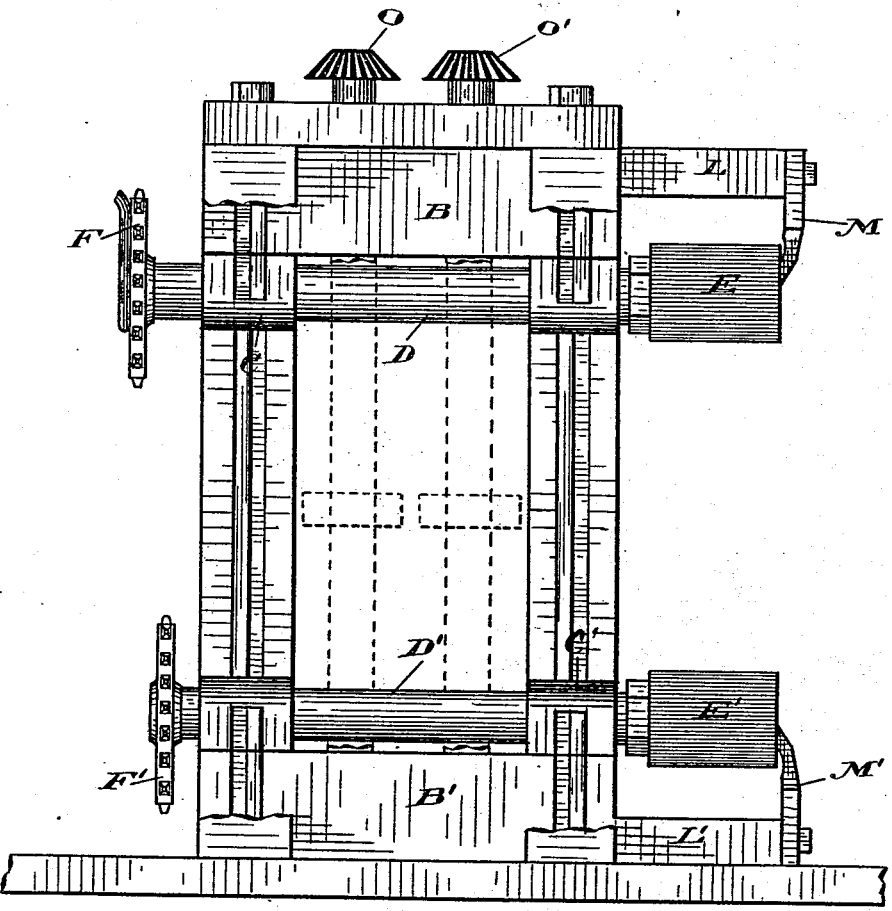
Figure 6:
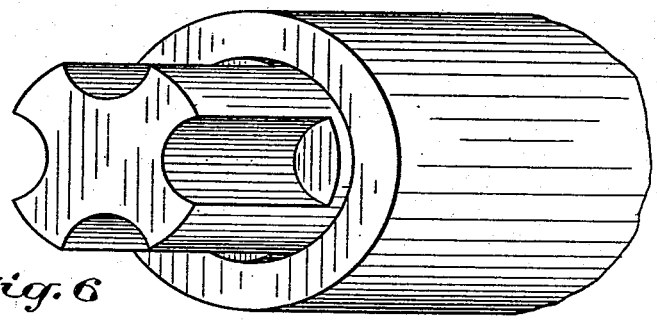
Figure 7:
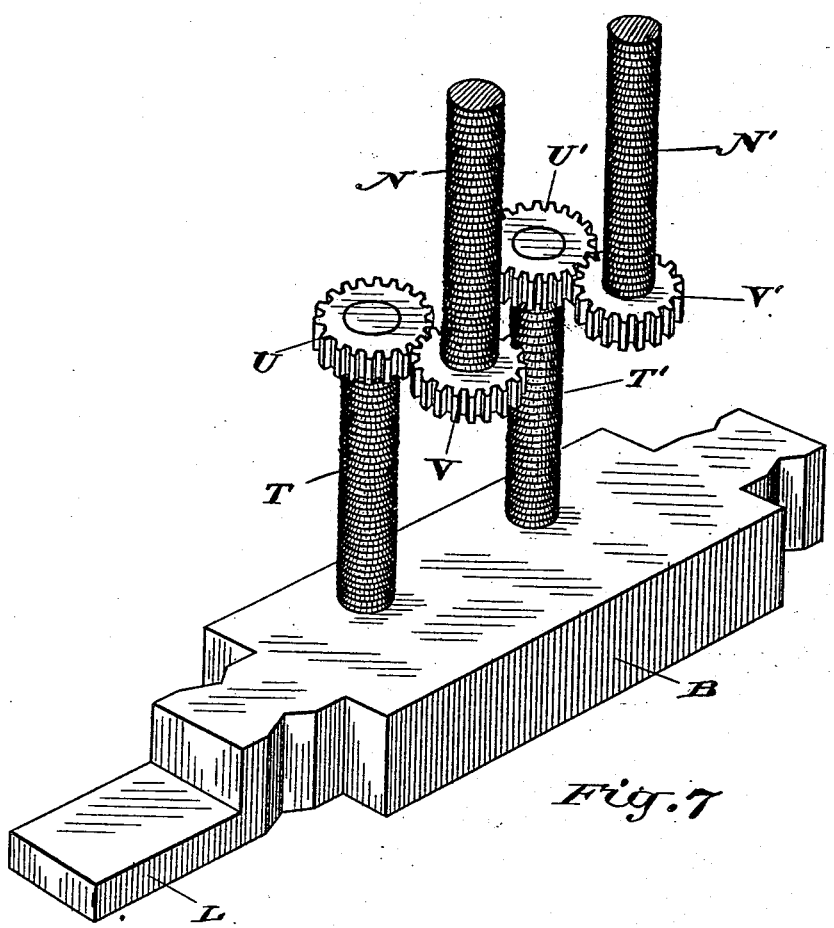

In the drawings, Figure 1 is a side elevation of the machine. Fig. 2 is a front elevation of the machine. Fig. 3 is a rear elevation of the machine. Fig. 4 is a view showing the trip mechanism for throwing the feed-gear out of action. Fig. 5 is a view similar to Fig. 2, showing the frame partially removed. Fig. 6 is a view of the end of one of the rolls, showing the wabblers cut by my machine. Fig. 7 is a detail perspective of the screw mechanism for moving the cross-heads to and from each other.

Like letters of reference refer to like parts throughout the specification and drawings.

The machine consists of a frame A, in the sides of which are formed guides for the two sliding cross-heads B B', respectively. The normal or starting position of the cross-head B is at the top of the machine, while the normal or starting position of the cross-head B' is at the bottom of the machine, the cross-heads being so arranged and operated as to work toward or away from the middle of the machine, so as to respectively bring the cutter-heads into or out of engagement with their work.

Formed on the under side of the cross-head B are bearings C for the shaft D of the cutter-head E. Mounted on the end of the shaft D is a sprocket-wheel F.

Formed on the top of the cross-head B' are bearings C' for the shaft D' of the cutter-head E', and mounted on the end of the shaft D' is a sprocket-wheel F'. Mounted in bearings G, connected to the frame A, is the main driving-shaft H, and mounted on the main driving-shaft H is the driving-pulley I. Mounted on the main driving-shaft H is a sprocket-wheel J, and passing around the sprocket-wheels F J is a sprocket-chain K. Mounted on the main driving-shaft H, contiguous to the sprocket-wheel J, is a second sprocket-wheel J', and passing around the sprocket-wheels F' J' is a sprocket-chain K'.

The cross-head B is provided with an arm or extension L, and connected to the arm or extension L is a mandrel M, which is intended to support the outer end of the cutter-head E. The outer end of each of the cutter-heads E is slightly concaved to allow of the lower end of the mandrel entering completely into the concaved part of the cutter-head in order that the cutter-head when coming into contact with its work will receive no hinderance from its mandrel.

The cross-head B' is provided with an arm or extension L', to which is connected a mandrel M', arranged to support the outer end of the cutter-head E'. The outer end of the cutter-head E' is partially concaved to correspond with the cutter-head E and for the same purpose.

Journaled in the top of the frame A are two screw-threaded shafts N N', respectively, the screw-threaded portions of which pass through the cross-head B. Mounted on the outer end of the screw-threaded shaft N is a bevel-gear O, and mounted on the outer end of the screw-threaded shaft N' is a bevel-gear O'.

Mounted in bearings P on the top of the frame A is a shaft Q, and mounted on the shaft Q are bevel-gears R R', which respectively mesh with the bevel-gears O O'. Mounted on the shaft Q is a hand-wheel S, provided with a crank S', by means of which the shaft and bevel-gears are revolved to turn the screw-threaded shafts N N'. I do not confine myself, however, to the use of the hand-wheel S for the purpose of revolving the shaft Q, as I may, if I so desire, operate the shaft Q from the main driving-shaft H.

Journaled in the lower part of the frame A are two screw-threaded shafts T T', the screw-threaded portions of which pass through the cross-head B'. Mounted on the inner ends of each of the screw-threaded shafts T T' is a gear-wheel U U', respectively. The gear-wheel U on the inner end of the screw-threaded shaft T meshes with the gear-wheel V on the inner end of the screw-threaded shaft N, while the gear-wheel U' meshes with a gear-wheel V' on the inner end of the screw-threaded shaft N'. The revolution of the screw-threaded shafts N N' causes a corresponding revolution of the screw-threaded shafts T T' on account of the gear-wheels U U' meshing with the gear-wheels V V' on the ends of these screw-threaded shafts. The revolution of the screw-threaded shafts N N' and T T' in one direction causes the cross-heads B B' to move toward the middle of the machine and carry with them the shafts D D' with their cutter-heads E E', respectively, so that the cutter-heads E E' may be brought into engagement with their work.

Journaled in the upper part of the machine is a spindle W, and mounted on the spindle W is a gear-wheel W', which meshes with a gear-wheel P', rigidly mounted on the shaft Q. Loosely journaled on the spindle W is an arm Q', to which is pivotally connected a dog X, engaging with the teeth of the gear-wheel W'. Connected to the outer end of the dog X is a hinged trip X', which engages with a set collar or nut Y, carried by the graduated trip-rod Y', connected to and moving with the shaft D. Mounted on the main driving-shaft is a blind-pulley I'', and formed in the side face of the pulley I'' is a dovetailed groove or slot Z, and within this groove or slot Z is the head of a bolt Z', which passes through a pitman a, at or near its lower end. Fitted on the outer end of the bolt Z' is a set-nut a', which is screwed on the bolt Z' and binds the pitman a tightly against the side face of the pulley I'' and locks together the pitman and driving-pulley.

The object of the groove Z and the bolt Z' is to permit of the pitman a being moved to any required distance from the center of the pulley I'' to regulate the length of the stroke of the pitman a. The upper end of the pitman a is connected to the arm Q', and the stroke of the pitman a operates the arm Q'. As the dog X is carried by the arm Q', the arm Q' necessarily operates the dog X to move forward the gear-wheel W' while the dog X is in engagement with the teeth of the said gear-wheel. The revolution of the gear-wheel W' causes the revolution of the gear-wheel P' and shaft Q to revolve the screw-threaded shafts N N' and T T', respectively. By moving the pitman a toward the center of the pulley I the length of the stroke of the pitman is diminished with a consequent diminution in the revolution of the gear-wheel W'. By moving the pitman a away from the center of the gear-wheel W' the length of the stroke of the pitman is increased with a consequent increase in the partial revolution of the gear-wheel W'.

I find it necessary to regulate the length of the stroke of the pitman a in order that the rapidity of the feed of the cutter-heads to their work may be regulated, as I find it necessary when cutting hard or chilled steel to cut very slowly in comparison with the cutting of soft steel.

Pivotally connected to the end of the frame A and arranged one on each side of the path of the cutter-heads E E' are two spring-operated dogs b, which are so arranged as to enter into the wabblers cut by the cutter-heads E E' in the end of the roll so that the roll may be properly held while the cutter-heads are cutting the remaining wabblers.

The operation of the machine is as follows: Motion is transmitted to the machine through the driving-pulley I, which in turn transmits motion to the driving-shaft H. Motion is then transmitted from the driving-shaft H to the shafts D D' by means of the sprocket-chains K K' and the corresponding sprocket-wheels. The revolution of the shafts D D' causes the revolution of the cutter-heads E E', so that the cutter-heads can cut the wabblers when brought into engagement with their work. The revolution of the pulley I'' operates the pitman a to move the gear-wheel W'. This gear-wheel W', meshing with the gear-wheel P' on the shaft Q, causes the revolution of the shaft Q and bevel-gears R R'. The revolution of the bevel-gears R R' causes the revolution of the bevel-gears O O' and screw-threaded shafts N N' and T T'. The revolution of the screw-threaded shafts N N' and T T' in one direction brings the cross-heads B B' toward the middle of the machine, and the cross-heads B B', carrying the shafts D D', move toward each other the shafts and cutter-heads, so that a wabbler of any required and predetermined depth may be cut in the end of the roll. To regulate the depth of the wabbler when cut by the cutter-heads E E', the set-nut Y on the trip-rod Y' is adjusted, and when this set-nut Y comes into engagement with the trip X' it throws the dog X out of engagement with teeth of the gear-wheel W' and instantaneously stops the feed of the cutter-heads E E' toward each other.

Having thus fully described my invention, what I claim as new, and desire to secure by Letters Patent, is—

1. A wabbler-cutting machine, comprising a frame, two oppositely movable cross-heads in the frame, a shaft journaled in each of the cross-heads, a cutter-head on each of said shafts, a mandrel connecting the end of the extension of the cross-head and the outer end of the cutter-head, means for rotating the cutter-head shafts, screw-threaded supports for sustaining the cross-heads, and means to turn the threaded-supports and move the cross-heads vertically up or down, substantially as described.

2. A wabbler cutting machine, comprising a suitable frame, two cross-heads movably mounted in the frame, inter-engaging screw-threaded supports to move the cross-heads to and from each other, a shaft on each of the cross-heads, a cutter-head on each of the shafts, and means to turn the inter-engaging threaded supports, and means to rotate the shafts and cutter-heads, substantially as described.

3. A wabbler cutting machine, comprising a suitable frame, two cross-heads movably mounted in the frame and formed with bearings and extensions, projecting beyond the frame, a shaft journaled in the bearings of each cross-head, a cutter-head on each of the shafts, formed with a recess in its free or outer end, mandrels connecting the extensions of the cross-heads and the cutter-heads, vertically arranged and rotatable threaded supports, to move the cross-heads to and from each other, and means to rotate the threaded supports, and the cutter-heads and shafts, substantially as described.

4. A wabbler cutting machine, comprising a frame, two sliding cross-heads mounted in the frame and arranged to move toward and away from each other, a shaft carried by each of the sliding cross-heads, a cutter-head mounted on each shaft, an arm connected to each of the cross-heads, and a mandrel connected to each of the said arms, and arranged to support the free end of its respective cutter-head, mechanism for imparting motion to each of the shafts, mechanism for moving the cross-heads toward and away from each other to bring the cutter-heads respectively into or out of engagement with their work, mechanism arranged to stop the feed of the cross-heads toward each other, and mechanism to regulate the rapidity of the feed of the cross-heads toward each other, substantially as set forth.

5. In a wabbler cutting-machine, the combination of the frame, oppositely movable screw-threaded supports in the frame, screw-threaded supports for the shafts, gearing intermediately connecting the screw-threaded supports, and arranged to turn them in order to move the cross-heads to and from each other, and cutter-heads on the shafts, all substantially as shown and described.

6. In a wabbler cutting machine, the combination of the cutter-heads, movable to and from each other, of two spring-actuated dogs, arranged to enter the grooves in the wabblers cut by the cutter-heads so that the roll may be held while the other grooves in the wabblers are being cut, substantially as shown and described.

7. In a machine for cutting wabblers, the combination with sliding cross-heads, the shafts mounted thereon, and the cutter-heads on the shafts, and vertically arranged screw-threaded adjusting rods to move the cross-heads toward and from each other, gears on the adjusting-rods, a shaft having gears to mesh with the gears of the adjusting-rods, a driving-pulley, a pitman adjustably secured thereto and having its ends secured to an arm on the gear-shaft, a gear wheel adjacent to said arm, a latch on the arm, an arm Y' on the cutter-head shaft, passing through the said latch, and a set-nut Y on the arm, substantially as and for the purpose specified.

8. In a machine for cutting wabblers, the combination of the shaft D, the arm Y' secured thereon, the adjusting nut Y on the arm, the shaft Q, the arm Q', gear-wheel W', latch X, hinged trip X', pitman a, and driving means, substantially as and for the purpose specified.

9. The combination with the mechanism for moving the cutter-heads toward and away from each other, of a driving-means, a pitman connected thereto, a latch connected to the pitman, a trip-nut connected to the latch, a trip-rod projected through the trip-nut, and a set-nut on the trip-rod, substantially as specified.

Sharon, February 20, 1895.

LOUIS KIEFER.

In presence of—
JOHN H. ELLIOTT,
J. G. MALCOLM.